United States Patent [19]
Mosher

[11] 3,717,883
[45] Feb. 27, 1973

[54] CARDIAC VALVE REPLACEMENT
[75] Inventor: Fred D. Mosher, Erie, Pa.
[73] Assignee: Techno Corporation, Erie, Pa.
[22] Filed: Nov. 23, 1970
[21] Appl. No.: 91,950

Related U.S. Application Data

[63] Continuation-in-part of Ser. No. 769,932, Oct. 23, 1968, abandoned.

[52] U.S. Cl............3/1, 3/DIG. 3, 137/525.1, 137/525.5, 137/515
[51] Int. Cl........A61f 1/22, F16k 15/16, F16k 17/04
[58] Field of Search......3/1, DIG. 3; 137/525, 525.1, 137/525.3, 525.5, 515, 515.3

[56] References Cited

UNITED STATES PATENTS

| | | | |
|---|---|---|---|
| 2,688,979 | 9/1954 | Kendrick | 137/525.1 |
| 3,072,145 | 1/1963 | Nelson | 137/525.1 |
| 3,099,016 | 7/1963 | Edwards | 3/DIG. 3 |

FOREIGN PATENTS OR APPLICATIONS

| | | | |
|---|---|---|---|
| 1,464,971 | 11/1966 | France | 3/DIG. 3 |
| 941,816 | 11/1963 | Great Britain | 137/525.1 |

OTHER PUBLICATIONS

"New Silicone Rubber Heart Valves," Bulletin of Dow Corning Center For Medical Research, April, 1964, page 6.

*Primary Examiner*—Richard A. Gaudet
*Assistant Examiner*—Ronald L. Frinks
*Attorney*—Charles L. Lovercheck

[57] ABSTRACT

A valve suitable for cardiac surgery to replace a diseased valve. The valve is made of a molded material which will be compatible with the human body. The valve has a generally hemispherical shape with annular grooves around its base. Rings are disposed in the grooves which merge with the base to define a concave peripheral groove. The concave groove is provided so that a soft fibrous material may be secured thereto allowing the entire assembly to be sutured in a flexible conduit such as a vein or a principal artery. The hemispherical part of the valve is divided into petals which will spread like the sections of an orange peel when fluid force is exerted in one direction. The petals will close when a force is exerted in the opposite direction.

2 Claims, 4 Drawing Figures

PATENTED FEB 27 1973

3,717,883

FRED D. MOSHER  Inventor

By Charles L. Lonerbach
Attorney

CARDIAC VALVE REPLACEMENT

REFERENCE TO CO-PENDING APPLICATION

This application is a continuation-in-part application of patent application, Ser. No. 769,932, filed Oct. 23, 1968, now abandoned.

BACKGROUND OF THE INVENTION

1. Field of Invention

This invention relates to valves and, more particularly, to valves having a full, unrestricted opening along the free flow of liquids or gases with a minimum pressure loss resulting from said flow and with an outer periphery especially adapted for use in a conduit such as a vein in a living body.

2. Reference to Prior Art

The following patents have been noted as of interest in the present application:

U.S. Pat. Nos. 2,629,393; 3,130,418; 3,143,742; and 3,197,788.

OBJECTS OF THE INVENTION

It is, accordingly, an object of this invention to provide a valve, particularly a check valve, which is simple in construction, and economical to manufacture, and efficient to use.

Another object of the invention is to provide an improved check valve.

A further object of the invention is to provide a check valve which will have virtually unobstructed flow in an open direction and which will minimize turbulence in the fluid stream.

Yet another object of the invention is to provide a quick opening and closing check valve which will prevent hydraulic shock in the piping system.

Another object of the invention is to provide a check valve which will occupy a minimum of "envelope" space.

Another object of the invention is to provide a valve assembly constructed with a minimum number of parts and made of materials which will permit one piece construction.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figure 1:
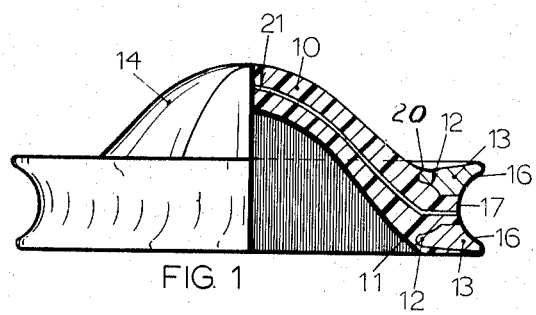
FIG. 1 is a longitudinal cross sectional view of the valve taken on line 1—1 of FIG. 2.
Figure 2:
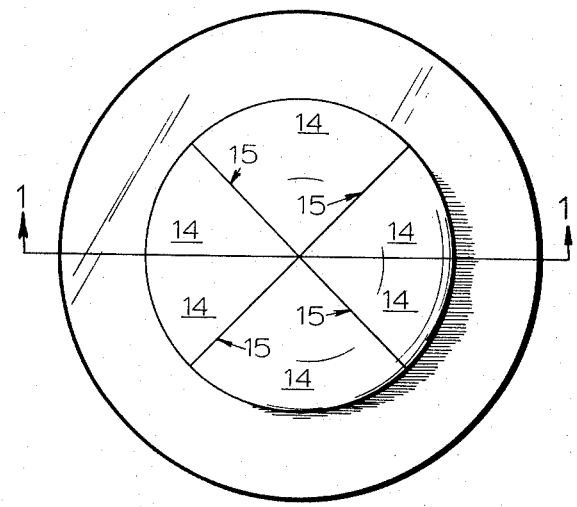
FIG. 2 is a top view of the valve.

Now with more particular reference to the drawings, the valve shown has a generally hemispherical body 10 that terminates in an annular rim 11. The rim 11 has circular grooves 12 which receive rings 13. The body is slit at 15 to form the petals 14.

The rings are designed so that they have outer arcuate concave surfaces 16 which merge with the arcuate concave surface 17 on the rim 11.

The valve body may be molded of an integral plastic material such as, for example, a medical grade silicone other medically acceptable plastic. The material will be sufficiently flexible and resilient that it will allow the petals 14 to move freely from an alternate open to a closed position and vice versa when pressure is supplied from the upstream direction and then changes to pressure in the downstream direction. The petals 14 may be reinforced with wire mesh or a fine wire 21 to support or bias the petals toward the closed position when the pumping head is other than normal. The petals are formed after molding by slitting the material accurately to allow for tight sealing. Very thin cuts or slits must be made to prevent leakage.

The support ring is so designed that a groove formed by the surfaces 16 and 17 is cast in the outer surface. The groove is so formed that a soft, fibrous material may be secured to the surface defining the groove, allowing the entire assembly to be "sutured" into a flexible conduit such as a blood vein, principal artery, or the like.

The valve body is secured to the ring by molding. It is necessary to provide a smooth surface at the juncture of the ring. Thus the top of the petals and the ring at 20 is in the form of a large radius which presents a smooth surface and avoids shoulders and ridges which would result in a buildup of a circular clot and would render the valve inoperative. The wires or mesh 21 bias the petals toward a closed position. The plural ring construction of FIG. 1 is essential to a proper construction and strength of the valve disclosed.

Figure 3:
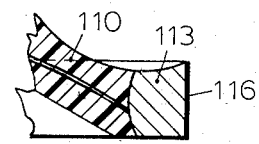

The supporting ring may have a cylindrical outer surface, as indicated in the embodiment shown in FIG. 3, at surface 116 on the ring 113 of the body 110. The ring also may be made of a ring member such as 213 attached to the body 210 in the embodiment shown in FIG. 4. In this embodiment, the outer surface is concave as indicated at 216.

In the shape shown in FIG. 3, the assembly may be fitted by couplings such as threaded connections, clamps or flanges and grooves to constitute an "in-line" check valve.

Figure 4:
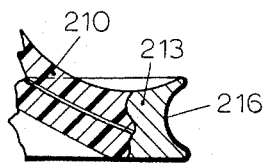
FIGS. 3 and 4 are partial cross sectional views of another embodiment of the valve.

The flexible member of the valve, the moving petals 14, may also be molded into a plain plastic ring, either plastic or metal, and then mechanically attached to a cylindrical member such as indicated in FIGS. 3 or 4 to which flanges may be attached or the flanges could be threaded, grooved or plain ends allowed to secure it in a line handling fluids carrying solids in suspension providing an unobstructed flow through the line and valve.

The above sets forth the invention in its generally practical forms but which is capable of certain modifications without departing from the invention and its broadly novel features within keeping of the claims.

The embodiments of the invention in which an exclusive property or privilege is claimed are defined as follows:

1. A valve suitable for cardiac surgery to replace a diseased valve comprising a hollow generally hemispherical body terminating at its base in an annular rim, said annular rim having two spaced concentric grooves formed therein and being adapted to be attached to a soft material, a first ring and a second ring, each said ring being disposed in a said groove, said hemispherical body being divided into generally triangular petals defined by slits terminating adjacent the edges of said body, said petals being concave when viewed from below and fixed to said body adjacent the base thereof, said petals being attached to said rings and said petals and said rings presenting a continuously curved surface curved about a relatively large radius, said body terminating in a first annular surface, each said ring having a second annular surface adjacent said first annular surface, said triangular petals each having an apex adjacent the apex of said hemispherical member, said first annular surfaces and said second annular surfaces merging together and having substantially the same radius of curvature and forming a single continuous surface.

2. The valve recited in claim 1 wherein said petals have a wire mesh molded therein, said wire mesh biasing said valve petals toward a closed position.

* * * * *